United States Patent
Choi

(10) Patent No.: US 9,553,917 B2
(45) Date of Patent: Jan. 24, 2017

(54) SERVER, DEVICE AND RECORDING MEDIUM FOR HTTP FILE TRANSFER DURING CHATTING SESSION ESTABLISHED BY ANOTHER PROTOCOL

(71) Applicant: SK TELECOM CO., LTD., Seoul (KR)

(72) Inventor: Woo Yong Choi, Anyang-si (KR)

(73) Assignee: SK TELECOM CO., LTD., Seoul (KR)

( * ) Notice: Subject to any disclaimer, the term of this patent is extended or adjusted under 35 U.S.C. 154(b) by 358 days.

(21) Appl. No.: 14/284,051

(22) Filed: May 21, 2014

(65) Prior Publication Data
US 2014/0258430 A1    Sep. 11, 2014

Related U.S. Application Data

(63) Continuation of application No. PCT/KR2012/009698, filed on Nov. 16, 2012.

(30) Foreign Application Priority Data

Nov. 22, 2011  (KR) ................. 10-2011-0122387

(51) Int. Cl.
*G06F 15/16* (2006.01)
*H04L 29/08* (2006.01)
(Continued)

(52) U.S. Cl.
CPC ........... *H04L 67/06* (2013.01); *H04L 12/1822* (2013.01); *H04L 51/04* (2013.01); *H04L 51/046* (2013.01); *H04L 51/08* (2013.01); *H04L 67/02* (2013.01)

(58) Field of Classification Search
CPC .. H04L 65/1016; H04L 65/1006; H04L 67/06; H04L 51/04; H04L 51/08; H04L 51/10; G06F 17/30017
(Continued)

(56) References Cited

U.S. PATENT DOCUMENTS 8,813,214 B1 * 8/2014 McNair ............ G06F 17/30861
                                                  726/12
2002/0133547 A1 * 9/2002 Lin ..................... G06Q 30/06
                                                  709/204
(Continued)

FOREIGN PATENT DOCUMENTS

KR    1020030017043 A    3/2003
KR    1020030020493 A    3/2003
(Continued)

OTHER PUBLICATIONS

Campbell et al., "RFC 4975—The Message Session Relay Protocol (MSRP)," Sep. 2007, Internet Engineering Task Force, tools.ietf.org/html/rfc4975.*

(Continued)

*Primary Examiner* — Ruolei Zong
(74) *Attorney, Agent, or Firm* — Hauptman Ham, LLP

(57) ABSTRACT

A message server for transferring a file by using hypertext transfer protocol (HTTP) during a chatting session established by another protocol, includes: a server transceiver unit configured to transmit and receive data; and a server control unit configured to provide a chatting service by establishing the chatting session between a transmitting terminal device and a receiving terminal device through the server transceiver unit, and transmit file link information to the receiving terminal device through the server transceiver unit when the file link information is received from the transmitting terminal device through the server transceiver unit, wherein the file link information is associated with a file uploaded using HTTP to a content server by the transmitting terminal device.

11 Claims, 3 Drawing Sheets

(51) Int. Cl.
*H04L 12/58* (2006.01)
*H04L 12/18* (2006.01)

(58) Field of Classification Search
USPC .......................................................... 709/206
See application file for complete search history.

(56) References Cited

U.S. PATENT DOCUMENTS

| | | | |
|---|---|---|---|
| 2003/0097410 A1* | 5/2003 | Atkins | H04L 29/06 |
| | | | 709/206 |
| 2009/0112457 A1* | 4/2009 | Sanchez | G01C 11/34 |
| | | | 701/533 |

FOREIGN PATENT DOCUMENTS

| | | |
|---|---|---|
| KR | 1020070007963 A | 1/2007 |
| KR | 1020090084948 A | 8/2009 |

OTHER PUBLICATIONS

Fielding et al., "RFC 2616—The Message Session Relay Protocol (MSRP)," Jun. 1999, Internet Engineering Task Force, tools.ietf.org/pdf/rfc2616.pdf.*
Korean Office Action for application No. 10-2011-0122387 dated May 23, 2013, citing the above reference(s).
International Search Report mailed Feb. 26, 2013 for PCT/KR2012/009698, citing the above reference(s).

* cited by examiner

SERVER, DEVICE AND RECORDING MEDIUM FOR HTTP FILE TRANSFER DURING CHATTING SESSION ESTABLISHED BY ANOTHER PROTOCOL

CROSS-REFERENCE TO RELATED APPLICATIONS

The instant application is a continuation of PCT/KR2012/009698, filed Nov. 16, 2012, which is based on and claims priority to Korean Patent Application No. 10-2011-0122387, filed on Nov. 22, 2011. The disclosures of above-listed applications are hereby incorporated by reference herein in their entirety.

TECHNICAL FIELD

The present disclosure relates to file transfer technology and, more particularly, to a server, a device and a recording medium for transferring a file by using hypertext transfer protocol (HTTP) while a chatting service is used with another protocol.

BACKGROUND

The statements in this section merely provide background information related to the present disclosure and do not constitute prior art.

Various message services such as, short message service (SMS), multimedia messaging service (MMS), etc. have been widely used, and now, instant messaging (IM) service is being actively used.

The IM service has advantages in that messages can be sent and received in substantial real-time compared to e-mail, as well as existing functions of transferring data of text and multimedia data are provided.

Session initiation protocol (SIP) has been widely used as a type of signaling protocol for such instant messaging. The SIP is an application layer protocol, which can establish, modify, and terminate multimedia sessions such as an internet telephone.

In addition, message session relay protocol (MSRP) is used as a protocol of transmitting and receiving data. In the MSRP, data transmitted from a transmitting terminal device (hereinafter, referred to as "transmitting terminal") to a receiving terminal device (hereinafter, referred to as "receiving terminal") is divided into chunks and transferred using MSRP sessions.

However, since the data is transferred between hops using a relay method when the data is transferred using the MSRP sessions, a transfer rate and a success rate are affected depending on a status of each hop.

Specifically, in situations in which network loads are recently increased due to the explosive growth of the IM services, unconditional data transfer using the chatting session may become a main cause to worsen network environments.

When data is transferred to a plurality of receiving terminals, since a final MSRP Report message is received after completing reception of the data by the last receiving terminal, there is a limit in that the transfer time is affected by an environment of the slowest receiving terminal.

SUMMARY

The present disclosure is directed to providing a device and recording medium for transferring a file by using HTTP while chatting. File transfer between two terminals in a chatting service is performed using HTTP, so that a file transfer rate can be enhanced together with an increasing success rate regardless of network environments.

In accordance with some embodiments, a message server for transferring a file by using hypertext transfer protocol (HTTP) during a chatting session established by another protocol, comprises a server transceiver unit and a server control unit. The server transceiver unit is configured to transmit and receive data. And the server control unit is configured to provide a chatting service by establishing the chatting session between a transmitting terminal device and a receiving terminal device through the server transceiver unit, and transmit file link information to the receiving terminal device through the server transceiver unit when the file link information is received from the transmitting terminal device through the server transceiver unit, wherein the file link information is associated with a file uploaded using HTTP to a content server by the transmitting terminal device.

In accordance with some embodiments, a terminal device for transferring a file by using hypertext transfer protocol (HTTP) during a chatting session established by another protocol, comprises a terminal transceiver unit, a terminal storage unit, and a terminal control unit. The terminal transceiver unit is configured to transmit and receive data. The terminal storage unit is configured to store the file. And the terminal control unit is configured to join the chatting session established with a receiving terminal device through a message server, upload the file to a content server through the terminal transceiver unit by using an HTTP, and transmit file link information associated with the file to the receiving terminal device through the terminal transceiver unit by using the chatting session when the file link information is received from the content server through the terminal transceiver unit.

In accordance with some embodiments, the non-transitory computer-readable recording medium containing a program for transferring a file by using hypertext transfer protocol (HTTP) during a chatting session established by another protocol, the program, when executed by a transmitting terminal device, causing the transmitting terminal device to execute: joining the chatting session established by a message server between the transmitting terminal and a receiving terminal device; uploading the file to a content server by using a HTTP POST message; receiving file link information associated with the uploaded file from the content server via a HTTP OK message; and transmitting the received file link information to the receiving terminal device through the message server by using the chatting session.

DETAILED DESCRIPTION

Figure 1:
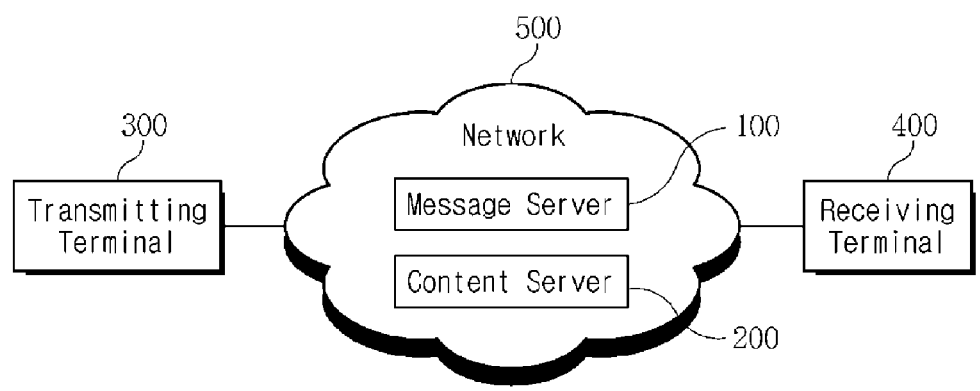
FIG. 1 is a configuration diagram of a file transfer system using HTTP while chatting according to at least one exemplary embodiment of the present disclosure.

Hereinafter, exemplary embodiments of the disclosure that are easily performed by those skilled in the art will be described in detail with reference to the accompanying drawings. In detailed descriptions of operation principles of the exemplary embodiments of the disclosure, when it is determined that detailed descriptions of related well-known functions or configurations unnecessarily obscure the gist of the disclosure, detailed descriptions thereof will be omitted. The present disclosure relates to file transfer technology for transferring a file by using hypertext transfer protocol (HTTP) while chatting in which, when a file is transferred between a transmitting terminal device and a receiving terminal device which are using a chatting service, the receiving terminal device receives the file through HTTP without using a chatting session.

Parts performing similar functions and operations throughout the drawings are denoted by the same reference numerals.

FIG. 1 is a configuration diagram of a chatting message transfer system according to at least one exemplary embodiment of the present disclosure. Referring to FIG. 1, the chatting message transfer system of the exemplary embodiment includes a message server 100, a content server 200, a transmitting terminal 300, a receiving terminal 400, and a network 500. All or some components of the chatting message transfer system, such as the message server 100, the content server 200, the transmitting terminal 300, and the receiving terminal 400 are implemented by one or more processors and/or application-specific integrated circuits (ASICs).

The network 500 is a communication network for exchanging information of data transmitting and receiving between the transmitting terminal 300, the receiving terminal 400, and the message server 100.

The network 500 includes an internet multimedia subsystem (IMS) infrastructure for providing an IP-based multimedia application service. The network 500 includes various wired networks or wireless networks, which have been already developed and commercialized or will be developed in the future, according to a type of the transmitting terminal 300 or the receiving terminal 400.

The network 500 includes a device such as a call state control function (CSCF) configured to perform functions of exchanging sessions and controlling calls.

The transmitting terminal 300 and the receiving terminal 400 are terminal devices, which support a function of chatting to users, and may be one of various wired terminals or wireless terminals, such as cellular phones, smartphones, household appliances, computers, notebook computers, and so on.

The transmitting terminal 300 includes a communication interface configured to transfer a chatting message or data to the receiving terminal 400, or upload a file to the message server 100, an input device configured to input the chatting message, a display device configured to display the received chatting message, and so on.

The receiving terminal 400 includes a communication interface configured to receive the chatting message or data from the transmitting terminal 300, or download the file from the message server 100, an input device configured to input the chatting message, a display device configured to display the received chatting message, and so on.

The message server 100 is a kind of chatting server configured to provide an IM service between the transmitting terminal 300 and the receiving terminal 400 in the network 500.

The message server 100 classifies subscribed users according to a user identifier, manages a status, a reception mode, a message receiver list, and subscriber environment information for each subscribed user, and manages IM chatting sessions for delivering IM chatting messages between on-line users.

The message server 100 performs a function of SIP call processing and MSRP relaying. It means that an SIP session call and an MSRP message are transferred via the message server 100 when the chatting service is provided between the transmitting terminal 300 and the receiving terminal 400.

When a user of the transmitting terminal 300 inputs a chatting message, and transfers the chatting message to the receiving terminal 400, a chatting session is established between the transmitting terminal 300 and the receiving terminal 400 through a process in which an SIP INVITE message is transferred from the transmitting terminal 300 to the message server 100, and the message server 100 transfers the INVITE message to the receiving terminal 400.

The transmitting terminal 300 uploads at least one file, which stored therein, to the content server 200 using an HTTP POST message. Here, POST is an HTTP method configured to perform a function in which a client sends any data to the server.

The content server 200, which receives the file from the transmitting terminal 300, stores the corresponding file, and transfers file link information of the stored file to the transmitting terminal 300.

When the content server 200 stores the received file, the received file is stored in an internal storage of the content server 200, or is stored in a separate external server capable of transmitting and receiving data to and from the network 500.

The content server 200 transfers the corresponding file link information to the transmitting terminal 300 using an HTTP 200 OK response message.

The file link information transferred to the transmitting terminal 300 by the message server 100 includes information about a file-stored location, for example, a uniform resource locator (URL) or a uniform resource indicator (URI).

According to at least one embodiment of the present disclosure, the file is uploaded from the transmitting terminal 300 to the content server 200 after the chatting session has been established between the transmitting terminal 300 and the receiving terminal 400, and alternatively, the chatting session is established between the transmitting terminal 300 and the receiving terminal 400 after the file is first uploaded from the transmitting terminal 300 to the content server 200. It is apparent that the technical scope of the present disclosure includes all of such technical ideas.

The transmitting terminal 300 that receives the file link information from the content server 200 transfers the corresponding file link information to the receiving terminal 400 via the message server 100 using the chatting session.

For example, the transmitting terminal 300 transfers the file link information of the stored file to the receiving terminal 400 using an MSRP SEND message.

The receiving terminal 400 that receives the file link information from the transmitting terminal 300 receives the stored file using the received file link information.

For example, the receiving terminal 400 downloads the corresponding file by transferring an HTTP GET message to the content server 200.

After completing the download, the receiving terminal 400 transfers a delivered notification message to the transmitting terminal 300 via the message server 100 through the MSRP session.

GET is an HTTP method which requests the server to find a resource that a URL included in an HTTP request line indicates and transfer the found resource to the client.

In this case, the receiving terminal 400 does not request downloading the file to the content server 200 at the same time when receiving the file link information from the transmitting terminal 300, but the file download is attempted at an appropriate time in consideration of a resource status of the receiving terminal 400 or a network load, etc. Accordingly, the above described exemplary embodiment renders an effective advantage to efficiently download the file during the chatting session by using another protocol (i.e., HTTP), which is different with the chatting session established through SIP based protocol (e.g., MSRP).

Thereafter, the receiving terminal 400 transfers an MSRP Report message to the message server 100, and the message server 100 transfers the MSRP Report message to the transmitting terminal 300 to notify of the transmission of the file.

Functions and operations of the message server 100 configured to store and provide the file will be described with reference to FIG. 2 in more detail according to the present disclosure.

Figure 2:
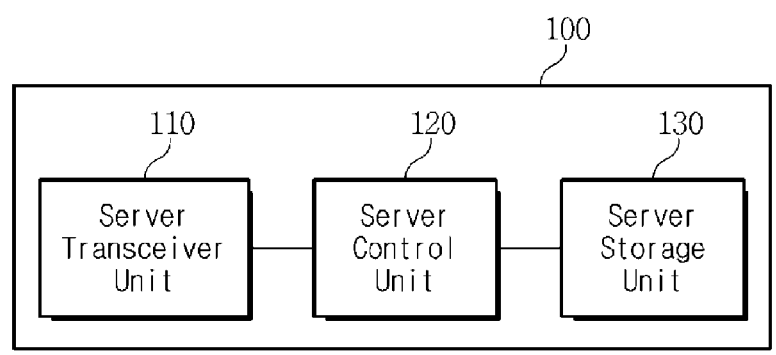
FIG. 2 is a configuration diagram of a message server according to the exemplary embodiment of FIG. 1.

FIG. 2 is a configuration diagram of the message server 100 according to the at least one embodiment of FIG. 1. Referring to FIG. 2, the message server 100 includes a server transceiver unit 110, a server control unit 120, and a server storage unit 130. All or some components of the message server 100, such as the server transceiver unit 110, the server control unit 120, and the server storage unit 130 are implemented by one or more processors and/or application-specific integrated circuits (ASICs).

The server transceiver unit 110 has an interface for transmitting and receiving data through the network 500.

The server storage unit 130 stores specific information required for establishing a chatting session and information contained in messages transmitted or received. The server storage unit 130 is storage (or a memory device) located in the message server 100, or is a data storage server, which is located outside the message server 100 and is capable of transmitting and receiving data with the message server 100.

The server control unit 120 is configured to function to control the overall operations of the message server 100, which includes the server transceiver unit 110 and the server storage unit 130, and includes a processor and related program storage for this function. Further, the server control unit 120 establishes the chatting session (MSRP session established by a MSRP based communication processing) between the transmitting terminal 300 and the receiving terminal 400 through transmitting and receiving of a message using the server transceiver unit 110.

Functions and operations of the content server 200 configured to store and provide the file will be described with reference to FIG. 3 in more detail according to the present disclosure.

Figure 3:
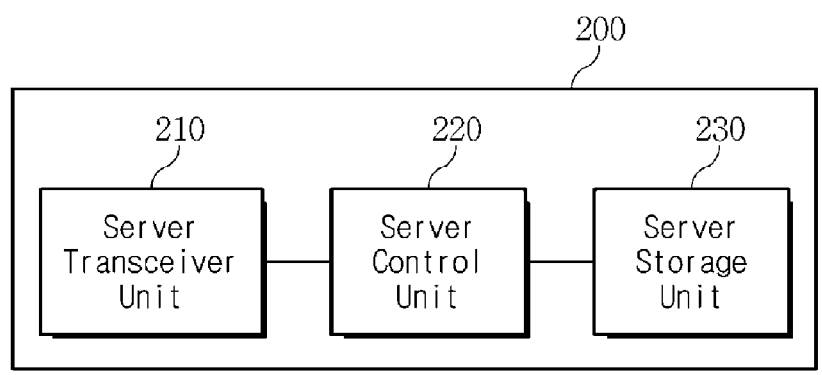
FIG. 3 is a configuration diagram of a content server according to the exemplary embodiment of FIG. 1.

FIG. 3 is a configuration diagram of the content server 200 according to the at least one embodiment of FIG. 1. Referring to FIG. 3, the content server 200 of the exemplary embodiment includes a server transceiver unit 210, a server control unit 220, and a server storage unit 230. All or some components of the content server 200, such as the server transceiver unit 210, the server control unit 220, and the server storage unit 230 are implemented by one or more processors and/or application-specific integrated circuits (ASICs).

The server transceiver unit 210 has an interface for transmitting and receiving data through the network 500.

The server storage unit 230 is storage (or memory device) for storing a file transferred from the transmitting terminal 300. The server storage unit 230 is storage located in the content server 200, or is a data storage server, which is located outside the content server 200 and is capable of transmitting and receiving data with the content server 200.

The server control unit 220 controls the overall operations of the content server 200, which includes the server transceiver unit 210 and the server storage unit 230, and includes a processor and related program storage for this function.

When the server control unit 220 receives the file from the transmitting terminal 300 through the server transceiver unit 210, the server control unit 220 stores the corresponding file in a user directory of the server storage unit 230. At this time, the corresponding file is uploaded to the server control unit 220 through an HTTP POST message from the transmitting terminal 300. The server control unit 220 transfers file link information of the file, which is stored in the server storage unit 230, to the transmitting terminal 300 through the server transceiver unit 210. For example, the server control unit 220 transfers the file link information to the transmitting terminal 300 using an HTTP 200 OK message.

The file link information, which the content server 200 transfers to the transmitting terminal 300, for example, includes information of a URL or a URI of a location in which the file is stored.

Thereafter, the server control unit 220 receives a transfer request for the file, which is stored in the server storage unit 230, from the receiving terminal 400 through the server transceiver unit 210.

Here, the server control unit 220, for example, receives an HTTP GET message, which includes URL or URI information of the stored file, from the receiving terminal 400, and transfers the corresponding file to the receiving terminal 400 by retrieving a file corresponding to the URL or URI information.

Functions and operations of the transmitting terminal 300 configured to upload the file to the content server 200 and transfer the file link information to the receiving terminal 400 will be described with reference to FIG. 4 in more detail according to the present disclosure.

Figure 4:
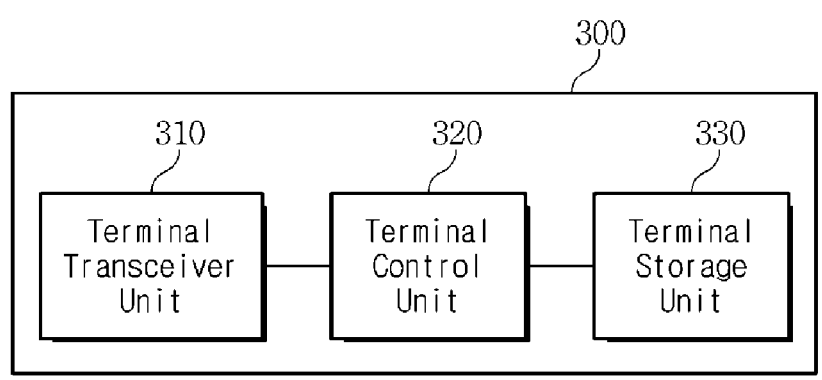
FIG. 4 is a configuration diagram of a terminal according to the exemplary embodiment of FIG. 1.

FIG. 4 is a configuration diagram of the transmitting terminal 300 according to the at least one embodiment of FIG. 1. Referring to FIG. 4, the transmitting terminal 300 of the exemplary embodiment includes a terminal transceiver unit 310, a terminal control unit 320, and a terminal storage unit 330. All or some components of the transmitting terminal 300, such as the terminal transceiver unit 310, the terminal control unit 320, and the terminal storage unit 330 are implemented by one or more processors and/or application-specific integrated circuits (ASICs).

The terminal transceiver unit 310 has an interface for transmitting and receiving data through the network 500.

The terminal storage unit 330 is storage for storing a file uploaded to the content server 200.

The terminal control unit 320 is configured to function to control the overall operations of the transmitting terminal 300, which includes the terminal transceiver unit 310 and the terminal storage unit 330, and include a processor and related program storage for this function.

When a user of the transmitting terminal 300 inputs a chatting message using an input device and transmits the chatting message to the receiving terminal 400, the terminal control unit 320 establishes a chatting session with the receiving terminal 400 through transmitting of an SIP INVITE message through the terminal transceiver unit 310.

Further, the terminal control unit 320 uploads a file, which is stored in the terminal storage unit 330, to the content server 200 through the terminal transceiver unit 310.

Here, the terminal control unit 320 transfers the file using an HTTP POST message, and the transmitting of the file to the content server 200 and the establishing of the session with the receiving terminal 400 is performed by changing an order thereof.

The terminal control unit 320, which uploads the file to the content server 200, receives file link information of the corresponding file through the terminal transceiver unit 310.

In this case, the terminal control unit 320 receives the file link information included in a body of a 200 OK message in response to the HTTP POST message, which is transferred to the content server 200.

The terminal control unit 320 transfers the received file link information to the receiving terminal 400 through the terminal transceiver unit 310 using the chatting session.

Here, the terminal control unit 320, for example, transfers the file link information to the receiving terminal 400 using an MSRP SEND message.

Processes of delivering a file held by the transmitting terminal 300 to the receiving terminal 400 will be described with reference to FIG. 5 in more detail according to the present disclosure.

Figure 5:
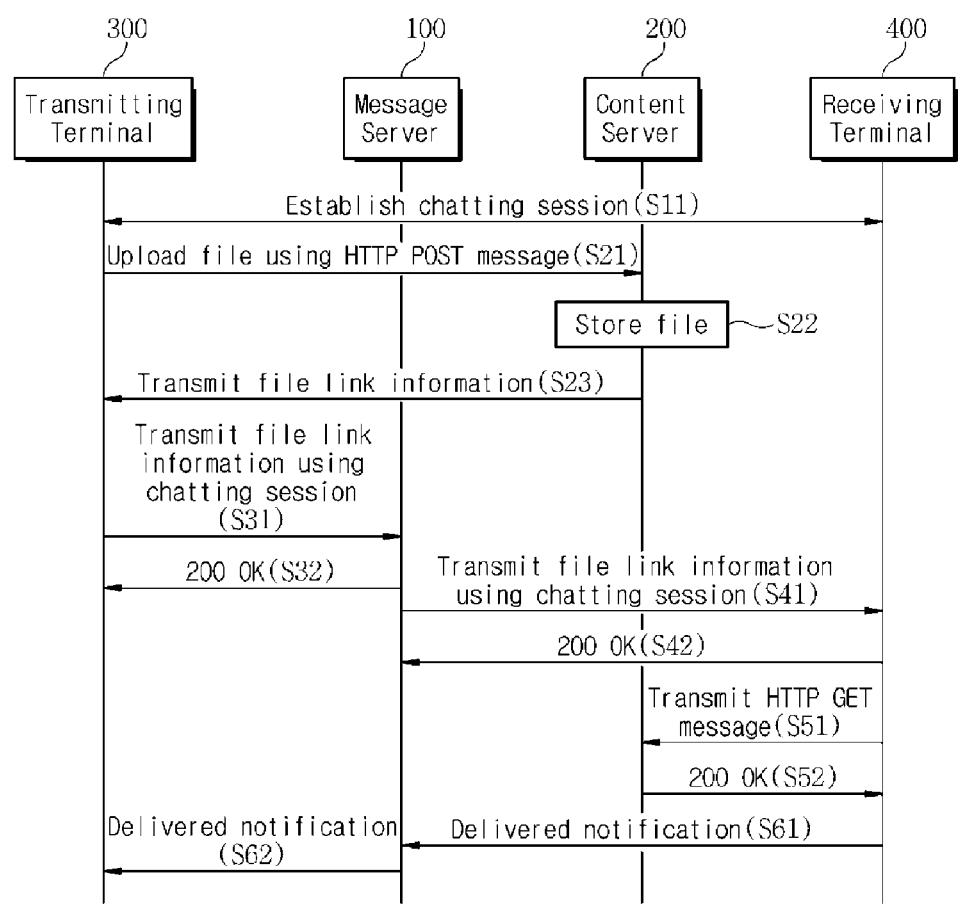
FIG. 5 is a flowchart of a method of transferring a file using HTTP while chatting according to at least one exemplary embodiment of the present disclosure.

FIG. 5 is a flowchart of a method of transferring a file using HTTP while chatting according to at least one embodiment of the present disclosure.

Referring to FIG. 5, a chatting session is established between a transmitting terminal 300 and a receiving terminal 400 (S11). As described above, it is exemplary assumed that the chatting session is established through Session initiation protocol (SIP) and a message session relay protocol (MSRP) between the transmitting terminal 300 and the receiving terminal 400.

The transmitting terminal 300 uploads a file stored therein to a content server 200 using an HTTP POST message (S21).

The content server 200 stores the file received in step S21 in an internal storage or a separate storage server (S22), and transfers file link information of the stored file to the transmitting terminal 300 (S23).

The content server 200 in step S23 may insert the file link information into a body of a 200 OK message and then transfer the message to the transmitting terminal 300 in response to the HTTP POST message received in step S21.

Here, the file link information transferred from the content server 200 to the transmitting terminal 300 may include information such as a URL and a URI which indicates a location of the corresponding file.

According to the at least one embodiment of the present disclosure, the establishing of the session in step S11 and the uploading of the file in step S21 to the transmitting of the file link information in step S23 may be performed by changing an order thereof, and the technical scope of the present disclosure covers to all of these steps.

The transmitting terminal 300, which receives the file link information in step S23, transfers the corresponding file link information to a message server 100 (S31), and the message server 100 transfers a 200 OK message as a response thereof to the transmitting terminal 300 (S32).

The message server 100 transfers the file link information to the receiving terminal 400 (S41), and receives a 200 OK message as a response thereof from the receiving terminal 400 (S42).

The file link information, which is transferred to the message server 100 in step S31, and the file link information, which is transferred to the receiving terminal 400 in step S41, are transferred using the chatting session established between the transmitting terminal 300 and the receiving terminal 400, and for example, is transferred using an MSRP SEND message.

The receiving terminal 400, which receives the file link information in step S41, transfers an HTTP GET message to the content server 200 using information such as a URL or a URI included in the corresponding link information (S51), and downloads the file through a process of receiving a 200 OK message (S52).

In this case, in step S51, the receiving terminal 400 does not request downloading of the file right after receiving the file link information in step S41, but the file download is attempted at an appropriate time in consideration of a resource status of the receiving terminal 400, or a network load, etc. Accordingly, the above described exemplary embodiment renders an effective advantage to more efficiently download the file.

Thereafter, the receiving terminal 400 transfers an MSRP REPORT message to the transmitting terminal 300 via the message server 100 to notify of the transmission of the file. That is, after the download is completed, the receiving terminal 400 transfers a delivered notification message to the message server 100 through an MSRP session (S61), and accordingly the message server 100 transfers the delivered notification message received through the MSRP session to the transmitting terminal 300 (S62).

Through this process, the transmitting terminal 300 does not directly transfer the file, which stored therein, to the receiving terminal 400 but uploads the file to the content server 200 on the network 500, and the receiving terminal 400 receives the file downloaded using the file link information.

In this case, the file stored in the content server 200 is actually transferred using HTTP rather than MSRP, and independence of file transfer can be ensured regardless of a network load of the chatting session.

According to the present disclosure, the file is transferred between the transmitting terminal and the receiving terminal which are using a chatting service using HTTP. Since there is no need that the receiving terminal receives the file at the same time when the transmitting terminal transfers the file and the file can be received by selecting a more appropriate time (or user or device preferred time), convenience of the receiving terminal user can be improved. Therefore, the service provider of the present disclosure can transfer data using network resources more efficiently.

In addition, when the file is transferred to a plurality of receiving terminals, it is prevented that a file transfer rate and a transfer success differ according to the terminal that a network load or a resource status thereof is worst. Therefore, each terminal can independently receive the file, and efficiency of a data transfer can be increased. Further, the receiving terminal may divide and receive the file using a plurality of file links, and it is also possible to interrupt and resume the receiving of the file depending on implementation of the receiving terminal. According to the various embodiments of the present disclosure, since a receiving terminal downloads a file, which is stored in a network server by a transmitting terminal, using HTTP, there is no need that the receiving terminal receives the file at the same time when the transmitting terminal transfers the file, and the file can be received by selecting a more appropriate time, and thus transfer efficiency is secured. There is an advantage in that a receiving rate and a success rate can be independently secured between receiving terminals when the file is transferred to a plurality of receiving terminals.

Some embodiments as described above are implemented in the form of one or more program commands that are read and executed by a variety of computer systems and be recorded in any non-transitory, computer-readable recording medium. Examples of the non-transitory computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

While preferable exemplary embodiments of the present disclosure are shown and described above, it should be understood by those of skilled in the art that the present disclosure is not limited thereto and various modifications or changes to the described embodiments may be made without departing from the spirit and scope of the claimed invention as defined by the appended claims. Specific terms used in this disclosure and drawings are used for illustrative purposes and not to be considered as limitations of the present disclosure. Exemplary embodiments of the present disclosure have been described for the sake of brevity and clarity. It should be considered that the disclosure is to cover all modifications, changes, and equivalents falling within the spirit and scope of the claimed invention.

What is claimed is:

1. A message server for transferring a file by using a second protocol during a chatting session established by a first protocol, the message server comprising:
    a server transceiver unit, implemented by one or more processors and/or application-specific integrated circuits (ASICs), configured to transmit and receive data; and
    a server control unit, implemented by one or more processors and/or application-specific integrated circuits (ASICs), configured to
        establish the first protocol for the chatting session between a transmitting terminal device and a receiving terminal device,
        provide a chatting service via the established chatting session of the first protocol through the server transceiver unit, and
        transmit file link information via the first protocol to the receiving terminal device through the server transceiver unit, wherein the file link information is received from the transmitting terminal device through the server transceiver unit after the second protocol session is established between the transmitting terminal device and the receiving terminal device, and the transmitting terminal device uploads a file to the content server via the second protocol,
    wherein the file link information is associated with a file uploaded using the second protocol to a content server by the transmitting terminal device,
    the first protocol and the second protocol is different protocol each other,
    the second protocol is separately established while the first protocol for the chatting session is continuously established, and
    the second protocol is established to upload the file from the transmitting terminal device to the content server, and download the uploaded file from the content server to the receiving terminal device.

2. The message server of claim 1, wherein the server control unit is further configured to
    provide the chatting service between the transmitting terminal device and the receiving terminal device through the established chatting session by using the first protocol which is a message session relay protocol (MSRP), and
    transmit the file link information, received from the transmitting terminal device, to the receiving terminal device through an MSRP SEND message.

3. The message server of claim 2, wherein the server control unit is configured to
    receive a delivered notification message from the receiving terminal device through the chatting session, and
    transmit the delivered notification message to the transmitting terminal device through the chatting session,
    wherein the delivered notification message is an MSRP REPORT message to notify that the receiving terminal device completes downloading of the uploaded file from the content server by using the second protocol,
    wherein the second protocol is hypertext transfer protocol (HTTP).

4. The message server of claim 2, further comprising:
    a server storage unit configured to store
        information for establishing the chatting session, and
        information contained in the MSRP SEND message.

5. A terminal device for transferring a file by using a second protocol during a chatting session established by a first protocol, the terminal device comprising:
    a terminal transceiver unit, implemented by one or more processors and/or application-specific integrated circuits (ASICs), configured to transmit and receive data;
    a terminal storage unit, implemented by one or more processors and/or application-specific integrated circuits (ASICs), configured to store the file; and
    a terminal control unit, implemented by one or more processors and/or application-specific integrated circuits (ASICs), configured to
        establish the first protocol for the chatting session with a receiving terminal device,
        join the established chatting session of the first protocol through a message server,
        establish the second protocol while the first protocol for the chatting session is continuously established,
        upload the file to a content server through the terminal transceiver unit by using the second protocol, and
        transmit via the first protocol for the chatting session file link information associated with the file to the receiving terminal device through the terminal transceiver unit, wherein the file link information is received from the content server through the terminal transceiver unit after the second protocol session is established between the transmitting terminal device and the receiving terminal device, wherein the first protocol and the second protocol is different protocol each other, and the second protocol is established to upload the file from the transmitting terminal device to the content server, and download the uploaded file from the content server to the receiving terminal device.

6. The terminal device of claim 5, wherein the second protocol is hypertext transfer protocol (HTTP), and the terminal control unit configured to upload the file to the content server through the terminal transceiver unit by using a HTTP POST message of the HTTP.

7. The terminal device of claim 5, wherein the first protocol is a message session relay protocol (MSRP), and the terminal control unit is further configured to transmit the file link information by using an MSRP SEND message.

8. The terminal device of claim 7, wherein the terminal control unit is further configured to receive a delivered notification message from the receiving terminal device through the message server via the chatting session of the first protocol, wherein the delivered notification message is an MSRP REPORT message to notify that the receiving terminal device has completed downloading of the uploaded file from the content server by using the second protocol.

9. A non-transitory computer-readable recording medium containing a program for transferring a file by using a second protocol during a chatting session established by a first protocol, the program, when executed by a transmitting terminal device, causing the transmitting terminal device to execute:

establish the first protocol for the chatting session with a receiving terminal device, joining the established chatting session of the first protocol through a message server;

establishing the second protocol while the first protocol for the chatting session is continuously established, uploading the file to a content server by using the second protocol;

receiving via the first protocol for the chatting session file link information associated with the uploaded file from the content server; and transmitting via the first protocol for the chatting session the received file link information to the receiving terminal device through the message server by using the chatting session of the first protocol, wherein the first protocol and the second protocol is different protocol each other.

10. The non-transitory computer-readable recording medium of claim 9, wherein the first protocol is a message session relay protocol (MSRP), and the second protocol is hypertext transfer protocol (HTTP).

11. The non-transitory computer-readable recording medium of claim 9, wherein the program, when executed by the transmitting terminal device, further causes the transmitting terminal device to execute:

receiving, from the receiving terminal device, a delivered notification message through the message server by using the chatting session of the first protocol, wherein the delivered notification message is an MSRP REPORT message to notify that the receiving terminal device has completed downloading of the uploaded file from the content server by using the second protocol.

\* \* \* \* \*